United States Patent [19]

Meckenstock

[11] Patent Number: 4,819,836
[45] Date of Patent: Apr. 11, 1989

[54] DISPENSER FOR DISPENSING PASTE COMPOSITIONS

[75] Inventor: Fritz Meckenstock, Wuppertal, Fed. Rep. of Germany

[73] Assignee: Mega Plast product- u. Verpackungsentwicklung Marketing Gesellschaft mit beschränkter Haftung & Co., Neuenburg, Fed. Rep. of Germany

[21] Appl. No.: 125,425

[22] Filed: Nov. 15, 1987

[30] Foreign Application Priority Data

Jun. 10, 1987 [DE] Fed. Rep. of Germany ....... 3719252

[51] Int. Cl.$^4$ .................. B65D 5/42; B29C 65/00
[52] U.S. Cl. .................. 222/386; 222/541; 264/249; 264/328.9; 53/489
[58] Field of Search .................. 222/206–207, 222/256, 327, 340, 386, 391, 386.5, 541, 482; 264/249, 328.9, 328.12; 53/471, 485, 487, 489; 425/577, 588, DIG. 58, DIG. 227

[56] References Cited

U.S. PATENT DOCUMENTS 4,298,036 11/1981 Horvath .................. 53/489 X
4,657,161 4/1987 Endo et al. .................. 222/386 X
4,671,432 6/1987 Benecke et al. .................. 222/386
4,747,199 5/1988 Kitchen .................. 264/249 X

FOREIGN PATENT DOCUMENTS

1034554 12/1958 Fed. Rep. of Germany .
1821202 9/1960 Fed. Rep. of Germany .
6025352 9/1960 Fed. Rep. of Germany .

Primary Examiner—Michael S. Huppert
Attorney, Agent, or Firm—Martin A. Farber

[57] ABSTRACT

A dispenser for dispensing paste compositions comprising a piston movable in an emptying direction within a dispenser housing, and a stopper part for closing the piston adapted to be driven in sealing manner into the piston. A stopper seat is developed in the piston and the dispenser housing is evacuatable by an air vent zone located in the region of the stopper seat, the zone being defined by slots formed between the stopper seat and the stopper part which are interrupted by radial arms of the stopper part. The arms form two separate sections which lie one behind the other in axial direction, and which are separated from each other by a free space, and at least those arms which lie on a cross-sectional plane of one section are formed as tear-off arms.

17 Claims, 12 Drawing Sheets

DISPENSER FOR DISPENSING PASTE COMPOSITIONS

FIELD AND BACKGROUND OF THE INVENTION

The present invention relates to a dispenser for the dispensing of paste compositions, having a piston which is movable in the emptying direction within a dispenser housing; a stopper part which serves to close off the piston and is driven in sealing manner into the piston; a stopper seat disposed within the piston and the dispenser housing is adapted for venting by means of a vent zone located in the region of the stopper seat.

Ventable dispenser vessels are already known from various embodiments. Federal Republic of Germany Utility Model GM No. 18 21 202 discloses, for instance, a dispenser vessel whose closure has a stopper part which is formed in part with arms which leave vent grooves free between a stopper seat and the stopper part. In a second region in this known dispenser vessel the stopper part is formed with a continuous cylindrical wall. The stopper part can, first of all, be driven into the stopper seat in a first position having vent paths open and the vessel can them be completely closed, by the further inward driving of the stopper part, the cylindrical wall of the stopper part coming against the stopper seat.

Federal Republic of Germany Utility Model GM No. 60 25 352 also discloses a dispenser in which the vent zone is formed by a roughened region of the inner surface of the dispenser housing opened on the bottom. A piston which is inserted into the dispenser housing naturally does not lie in completely sealing fashion against the wall surface of the dispenser housing in the region of the roughened zone, so that the emergence of air is possible.

In the last-mentioned dispenser, the function of intended non-tightness depends greatly on the viscosity and nature of the material to be introduced. The desired evacuation of the enclosed air is not obtained in all cases. For instance, fatty filling substances very easily clog the roughened annular slot. As a result of the vibrations which cannot be completely excluded in automatic filling machines and the stepwise transport from station to station, the surface of the filling can tilt so that the zone of roughening is already wetted in advance.

The first-mentioned dispenser does not have these disadvantages. However, also in the case of this known dispenser, the sealing obtained is not entirely satisfactory. Thus grooves or arms are made in a manner which is expensive to manufacture in the wall of the stopper part in order to obtain the desired vent channels. Furthermore, a relatively small stopper part must be driven into the stopper seat, which either makes an expensive device necessary or else must be effected by hand.

In this connection there is also known as prior art Federal Republic of Germany No. 10 34 554 which has a dispenser closure with stopper part connected via tear-off arms. A connection to the inside of the dispenser vessel, when the stopper part is not completely driven in, is, however, only present in this known dispenser closure by means—also in a relatively expensive manner—of a central bore as well as a radial bore in the stopper part.

SUMMARY OF THE INVENTION

In view of the above-indicated prior art and proceeding directly in this connection from Federal Republic of Germany Utility Model GM No. 60 25 352, it is an object of the invention to develop and improve the known dispenser so as to obtain the simplest possible manufacture and handling, while at the same time obtaining the best possible venting conditions for the composition filled therein.

According to the invention the arms (6, 7) form two separate sections which lie one behind the other in axial direction, and which are separated from each other by a free space, and at least those arms which lie on a cross-sectional plane of one section are formed as tear-off arms.

In accordance with the invention, the tear-off arms which are in any event present and which make manufacturing by a single injection molding possible, are used simultaneously for the better positioning of the stopper, with favorable air-passage cross section, tilt-proof preadjustment of the stopper, and very easy driveability of the latter. In detail, different procedural possibilities can be obtained in this regard.

In one procedure procedure, which is also preferred as of the time of the filing of the application for the invention, the tear-off arms which are obtained upon manufacture are broken off while still in the injection mold by the injection mold itself, and the stopper part is driven thereby—in part—into the stopper seat. On the other hand, the stopper part can also be removed from the injection mold in condition connected, via the tear-off arms, to the stopper seat and, in this condition, the piston with the homogeneously connected stopper part can be inserted into the dispenser housing, the air being able to escape via openings provided by the molding within the region of the tear-off arms. Both, the aforementioned apparatus and method will be described in further detail below.

In accordance with one advantageous further development which is possible with both said embodiments, one or more of the tear-off arms form an acute angle with a longitudinal axis of the stopper part. The tear-off arms are preferably directed forwards. This development has the advantage that these tear-off arms result in particularly favorable stability by cooperation with the stopper seat. Furthermore, these tear-off arms can, in view of their elasticity, for instance if the stopper seat is made slightly narrowed at the transition to the inside of the dispenser housing, produce a force component is forwardly directed, in the closing position and which assists in the dependable seating of the stopper.

The tear-off arms can, in accordance with the invention, be made of different dimensions. In particular, tear-off arms of different dimensions can be provided also on a stopper part (or on a piston, or more precisely, a stopper seat). Insofar as the tear-off arms serve merely for connecting the stopper part to the piston, the arms can extend approximately along the circumference of the stopper part and have openings for vent paths. However, it is also contemplated within the scope of the invention, that tear-off arms developed during manufacturing on the stopper part, serve as injection paths for the piston, as will also be explained in detail further below. Such tear-off arms have a relatively large diameter making it possible to effect the injection molding of the piston part via same upon the manufacture.

In accordance with another preferred embodiment, spacer warts are also or in additio developed on the circumference of the stopper part so as to form the vent zones. The spacer warts are bump-like projections which define spacing points over the length of the stopper part.

A first preferred stopper part has, pursuant to the invention, a conical, frustoconical front region and a substantially cylindrical region adjoining same. By fromt region it is understood the region of the stopper part faces the composition with which the dispenser is filled or is in contact with it in its driven-in condition. It is self-evident that the substantially cylindrical region is geometrically developed on the stopper seat in order to obtain the closing function. With a stopper seat, other than one of cylindrical shape, the substantially cylindrical region of the stopper part is provided with a similar deviating shape. The tear-off arms which form an acute angle with a center axis of the stopper part are preferably arranged in the front, conical region of the stopper part. On the other hand, the spacer warts are preferably arranged in the substantially cylindrical region.

As a further embodiment the cylindrical region has a circumferential annular bead. The latter serves, upon the further driving-in of the stopper part, as a sealing-ring surface for the inner surface of the stopper seat. The inner surface of the stopper seat is preferably formed as a cylindrical smooth surface.

In addition to this, the stopper seat is furthermore preferably provided, adjoining the substantially cylindrical region and within the conical region, with a collar which widens in funnel shape and increases in size to an amount exceeding the inner diametrical size of the stopper seat.

A second stopper part which, pursuant to the invention, presents another possible development is stepped down stepwise on its central section, the smaller cross-sectional region extending freely into the stopper seat and the tear-off arms being seated at the height of the steps and extending up to the free end edge of the stopper seat. This development also preferably has at least one sealing ring bead, the distance of this bead from the front end is smaller than the length of the stopper section of larger diameter.

The stopper seat also preferably concentrically extends inside of the piston, which is cup-shaped. For the relative small, only weakly attached stopper part, there is thus obtained a protected concealed position utilizing the cup wall of the piston. This is of importance in particular, under conditions of mechanical stressing such as present, for instance, in sorting devices, on conveyor paths or the like. In addition, tear-off arms of larger diameter or else support wings as they are commonly called, such as already described further above, which are located on the section of the stopper part of smaller cross section, also have a favorable effect here. They act to oppose axial tilting by very simple means.

It is further an object of the invention to provide a method of manufacturing a piston and a stopper part. In order to be able to make the method of manufacture as simple and rational as possible, the invention teaches that the piston and the stopper part are produced jointly by injection molding. In particular, the invention furthermore teaches that the piston is formed by injection from a central region, that to this there is provided a sprue element and that the sprue element is so shaped that it can be used as a stopper part. Since the piston itself must be absolutely concentric it is necessary that it be cast-on in the center. The manner of procedure in accordance with the invention of using the part necessary for this as stopper part makes it possible to effect the manufacture in one injection process without substantial waste.

In accordance with a further development of the method of manufacture, the stopper part is driven by the injection mold partly into the stopper seat. Upon the pulling out of the injection mold, and in particular of a part with which tear arms of large diameter have been molded, the sprue element or stopper part is pulled with it. However, it can also be provided that the injection mold has a ram which upon the removal from the mold drives the stopper part into the piston by the desired amount.

It is particularly preferred that, pursuant to the invention, the stopper part and the piston are made of polypropylene material. By the use of polypropylene material in accordance with the invention, the piston can be (simultaneously) injection-molded via relatively narrow sprues via the sprue element or the stopper part.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
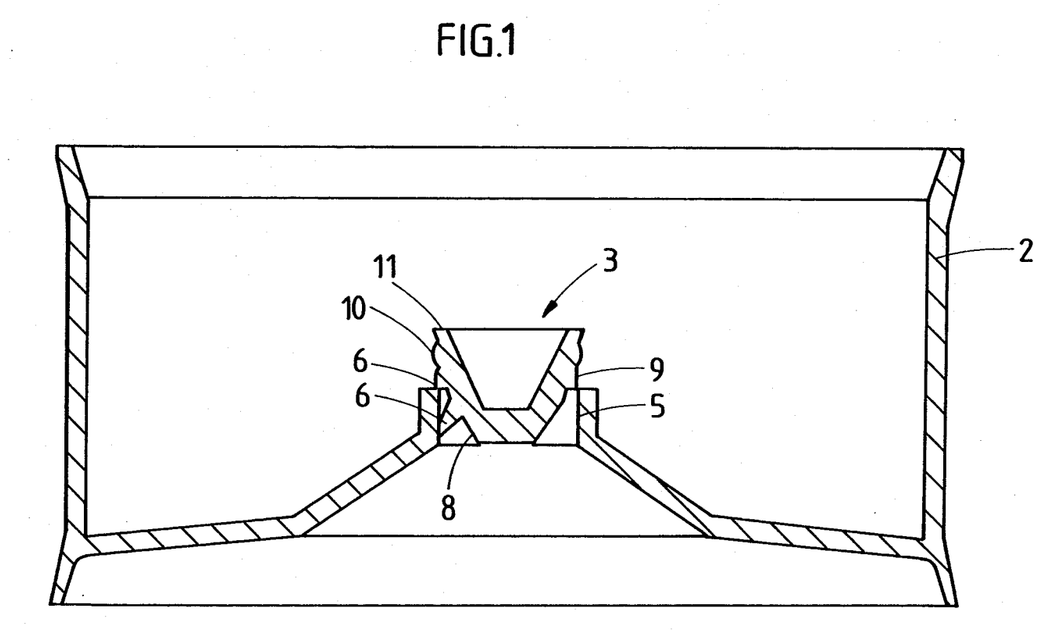
FIG. 1 is a cross-sectional view of a piston with a stopper part, shown in a first embodiment.
Figure 5:
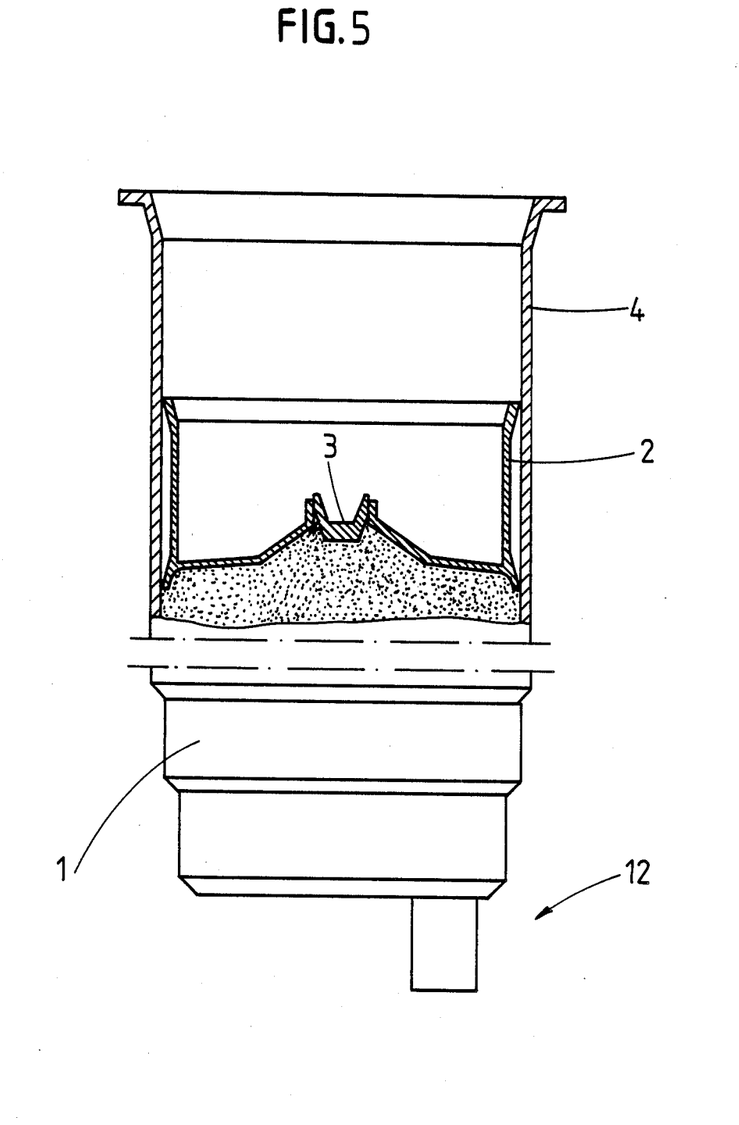
FIG. 5 is a view, partially cut away, of a dispenser with piston introduced and stopper part driven into place.

Referring now to the drawings, a dispenser 1 is shown and described (see for instance FIG. 5) having a piston 2 and a stopper part 3 which closes off the piston (see for instance FIG. 1).

The dispenser shown serves, for instance, for the dispensing of toothpaste. It has a dispenser housing 4 within which the piston 2 moves in the emptying direction, i.e. for instance downward in the drawing of FIG. 5. The stopper part 3 holds the dispenser 1 closed on the piston side upon use, but serves at the same time also for the venting of the dispenser 1 upon filling with the paste composition, for instance toothpaste.

Within the piston 2 there is developed a stopper seat 5, and the dispenser housing 4 can be vented in the region of the stopper seat 5 by a vent zone which will be explained in further detail below.

The stopper part 3 or, in part, also the piston 2 and/or the stopper seat 5 have tear-off arms 6 which are located in the region between the stopper seat 5 and the stopper part 3 and are advantageous for developing a slot which serves as the venting zone.

In a first embodiment of the stopper part 3, such as shown in particular in FIGS. 1 to 7, the tear-off arms 6 are developed upon manufacture as connecting bridges between the stopper part 3 and the stopper seat 5 (see in this connection FIG. 6), but then however are torn through upon removal from the mold, due to the partial driving of the stopper part 3 into the stopper seat 5. The tear-off arms 6 can be made in different detailed ways. In the case of the tear-off arms provided with the reference numeral 6 in FIG. 1, the upper tear-off arm 6 can, for instance, extend over a part of the circumference of the stopper part 3 while the lower tear-off arm 6 can be of a substantially circular cross section. It can also be seen that the lower tear-off arm 6 in FIG. 1 has a substantially larger diameter than the upper tear-off arm 6 in FIG. 1. Via the lower tear-off arm 6, the piston 2 can be injection-molded centrally over the stopper part 3 upon manufacture, as will be described in detail further below.

Figure 9:
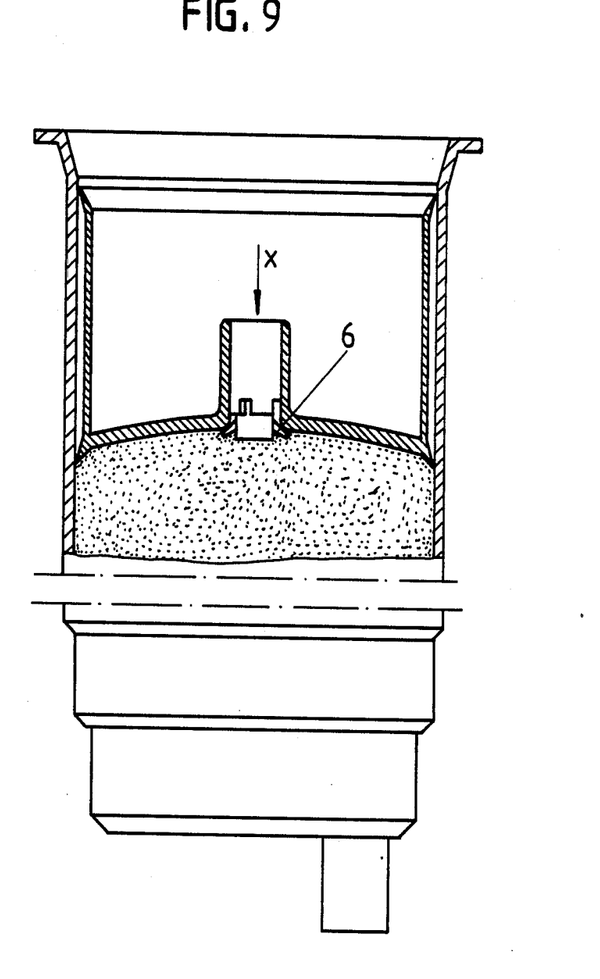
FIG. 9 is a view similar to FIG. 5 with a stopper part of a second embodiment.

Furthermore, the take-off arms 6 are, in part, so developed that they form an acute angle with a longitudinal axis of the stopper part 3. From FIG. 2, FIG. 5 or, for instance, FIG. 9 it can be seen that, in this way, there can be obtained, in the completely driven-in position of the stopper part 3, a component of force which functions to supportively hold the stopper part 3 in its driven-in position. It is therefore preferred, as is also effected in the embodiment shown, for such tear-off arms 6 to be forwardly directed and therefore towards the tip of the stopper part 3.

Figure 2:
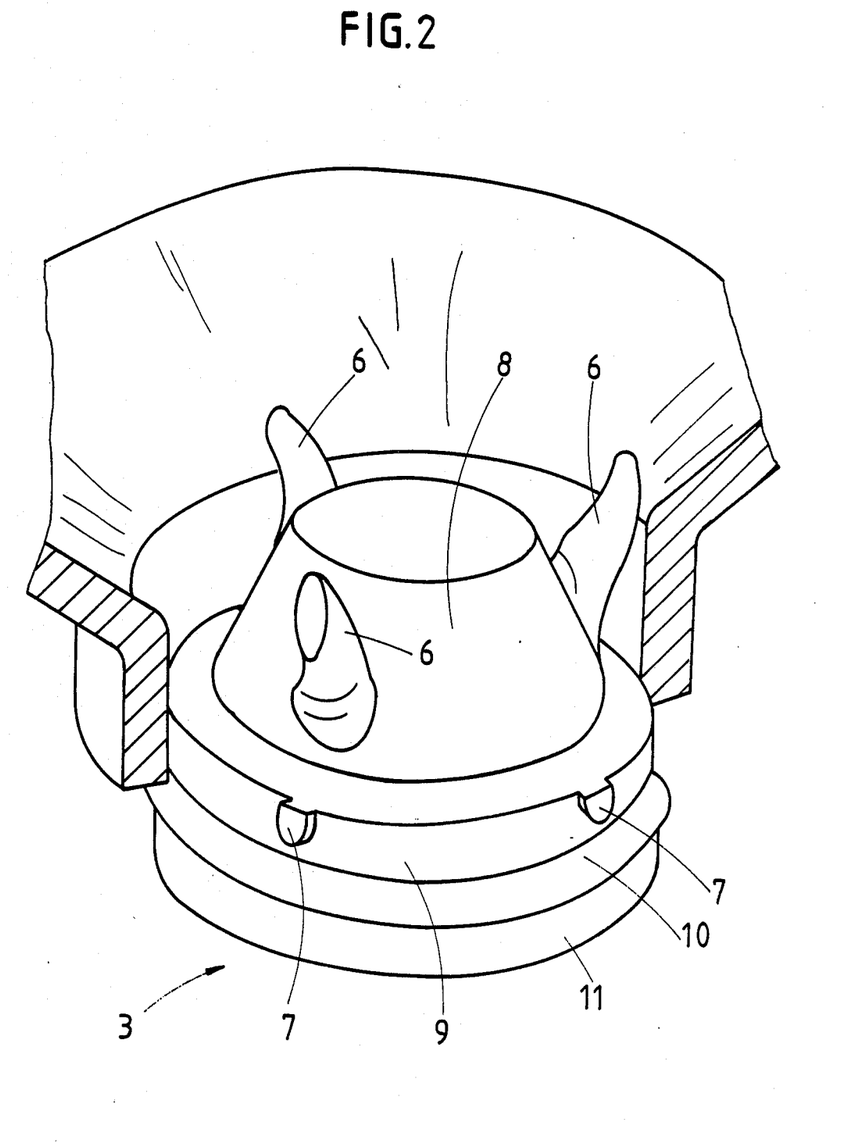
FIG. 2 is a view in perspective, partially cut away, of the piston and of the stopper part of the first embodiment.
Figure 3:
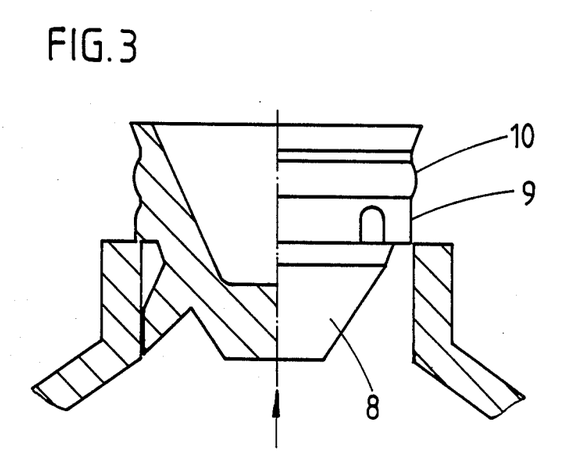
FIG. 3 is an enlarged view, partially in elevation and partially in section, of the stopper part of FIG. 1.
Figure 4:
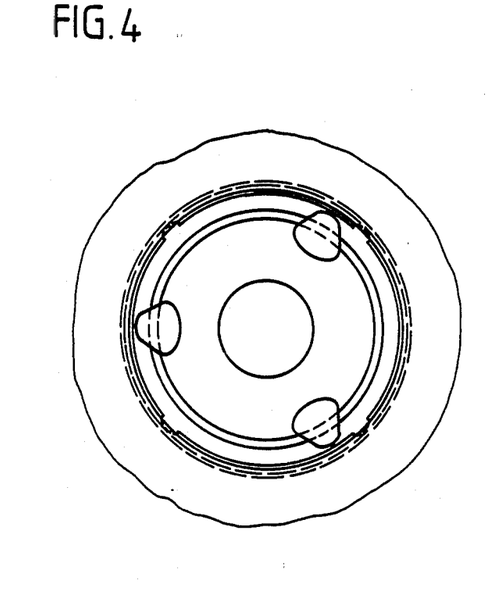
FIG. 4 is view in the direction of the arrow in FIG. 3.

FIG. 2 shows a stopper part 3 in which, in addition, spacer warts 7 are formed on the circumference in order to form the vent zone. The spacer warts 7 can also be initially developed by injection-molding in the form of tear-off arms.

The stopper part 3 of the first type has a conical or frustoconical front region 8 and a substantially cylindrical region 9 adjoining said front region. The cylindrical region 9 is divided into a front section which in a partially inwardly driven state cooperates with the stopper seat 5, forming the vent zone, and another section which has a circumferential annular bead 10 for the complete sealing in completely inward driven state. The spacer warts 7 are accordingly preferably developed in the front region of the cylindrical region 9.

In addition to this, the stopper part 3 adjoining the developed annular bead 10, widen's out in funnel shape in an end region 11 to such an extent that it exceeds the inner diameter of the stopper seat 5.

It may be mentioned that the dispenser 1 is provided in its downward directed head 12 with a dispenser mechanism such Application P No. 36 26 288.9, which does not constitute a prior publication.

A push button 13 extends from the head 12 so that the flat upper side 14 of the push button 13 forms the actuating surface. On the edge thereof there extends upwardly a mouthpiece 15, through the opening of which, the paste composition 16 within the dispenser housing 4 can be dispensed, in separate portions. For this purpose, the piston 2, which is introduced from the open end of the dispenser housing 4, moves stepwise in the emptying direction; see for instance the arrow x in FIG. 9.

The following up of the piston 2 takes place via the filling column of the composition 16.

The piston 2 has a push button 17, an outwardly open neck 18 being present centrally. This is a sort of pipe socket the wall of which extends concentrically to the wall 19 of the cup-shaped piston 2. The axial length of the neck 18 corresponds approximately to half the length of the cup-shaped piston 2.

In the embodiment described in FIGS. 10, 11, 12 and 13, the vent zone is formed by openings 20 which leave a slot 21 between the neck 18 or more precisely, the stopper seat 5 and a stopper part 3 connected to it via tear-off arms 6. For the formation of the slot 21, the stopper part 3 in the embodiment in question is stepped down stepwise approximately on its middle section. The stepped-down stopper section a extends freely into the inside of the stopper seat 5, while the stopper section b is of larger cross section and extends coaxially to the neck and therefore, like the latter, terminates also in the inside of the cup-shaped piston 2 but with a definite spacing y (FIG. 10) from the outer cup edge thereof developed as a lip 22. A corresponding lip 23 is present also on the opposite cup-bottom end of the piston 2.

Figure 14:
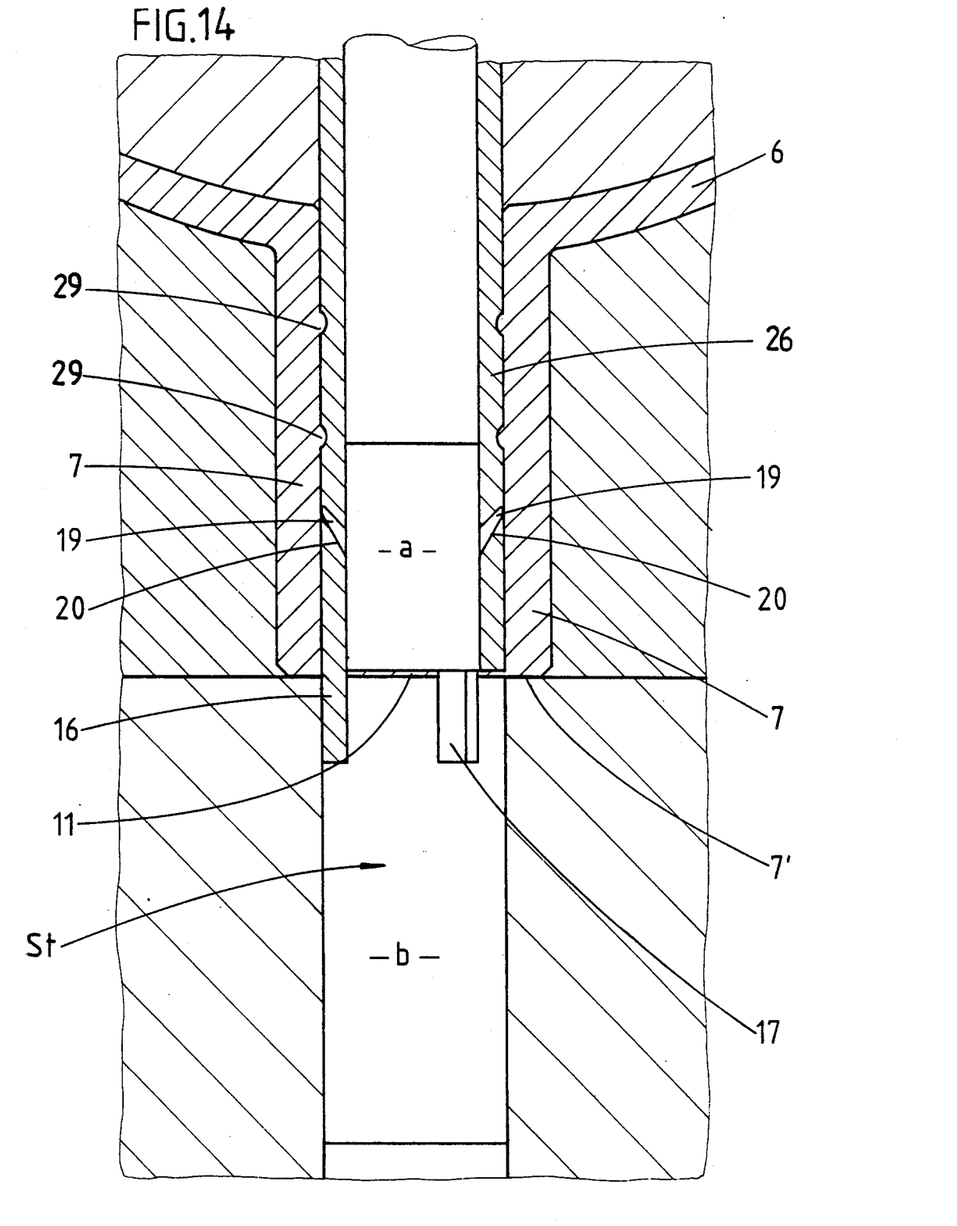
FIG. 14 is a vertical section through the piston-producing injection apparatus which is only partially shown.

The connection between the neck 8 or the stopper seat 5 and stopper part 3 which leaves the tear-off arms 6 lies at the height of the free or free end edge (24) of the neck 18. In this plane the stopper part 3 forms a clear step 25. The thickness of the material of the tear-off arms 6 of this development is a fraction of a millimeter. The length, measured in circumferential direction, of the tear-off arms 6 which form a so-called intended breakage place is longer than the width of the openings 20, measured in this direction. As a whole, three such openings 20 are provided with equal angular spacing on the circumference of the stopper part 3. They are produced in the injection mold by a tubular inner core 26 (see FIG. 14) which extends, with corresponding mold protrusions 27, beyond the plane of the end edge 24 of the neck 28 in the direction towards the open cup end of the piston 2. This leads to wall side niches 28, which continue in the direction of the stopper section b of larger cross section. The length thereof corresponds approximately to half the axial length of the diameter of the smaller section a. The tubular inner core 26 is suitably shaped with respect to the injection molding of the stopper section a of smaller diameter (see FIG. 14).

Furthermore, the injection mold takes into consideration annular fillets on the outer surface of the tubular inner mold 26 which lead to shallow-arched sealing-ring beads 29 on the inner surface of the neck 18. There are a total of two such sealing ring beads 29 spaced axially apart. They extend in the push-bottom-side half of the neck 18. The axial spacing of the sealing-ring bead 29 lying closer to the end edge 24 of the neck 18 is selected smaller than the length of the stopper section b of larger diameter. Thus, with a stopper length corresponding to the length of the neck, there is provided a high quality seal between the stopper part 3 and the piston 2 upon the complete driving in thereof.

For the additional dependable holding and supporting of the stopper part 3 while it still has not been driven in, oblique tear-off arms 6 are directed outward from the wall surface of the stopper section a of smaller cross section, which arms can be developed, in particular, as support wings 30. They converge towards the free end of the stopper section a and lie approximately in the end region thereof. Their support-wing ends lie on the otherwise cylindrical inner surface of the stopper seat 5. The corresponding position of inclination makes it possible, from the standpoint of molding technique, for damage-free detachment from corresponding mold cavities 31 (see for instance FIG. 7).

Figures 10, 11:
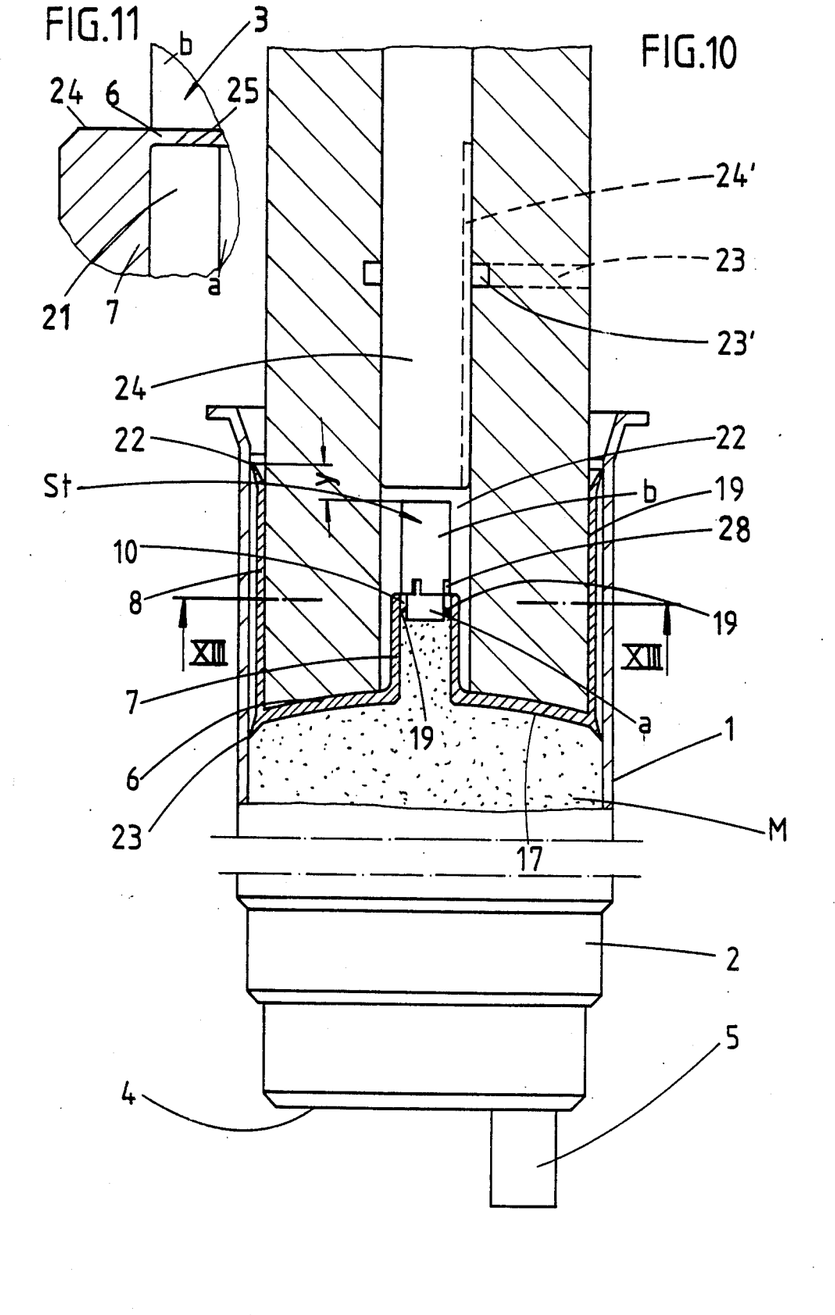
FIG. 10 shows a dispenser in the piston mounting phase with a stopper part of a second embodiment, partially in section.
FIG. 11 is an enlarged view of the region of connection between the stopper seat and the stopper part.
Figure 12:
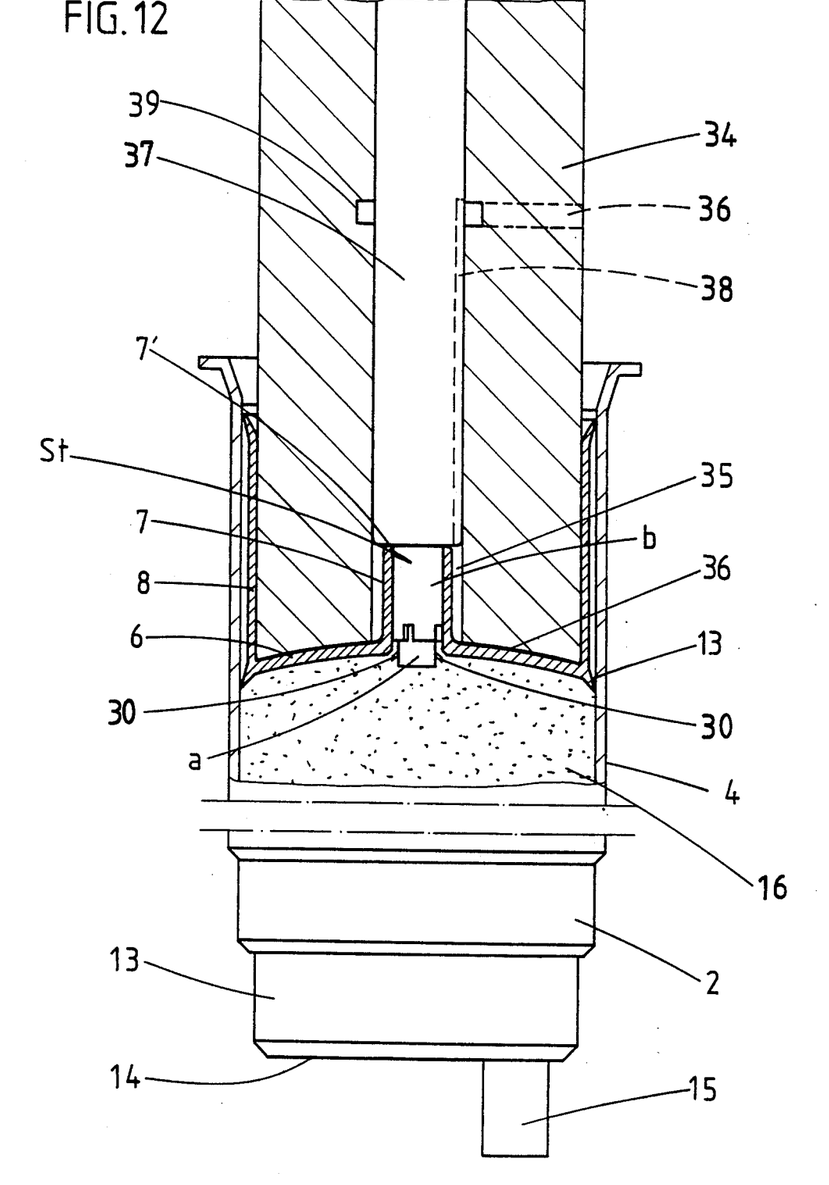
FIG. 12 shows the dispenser with the completed piston association and stopper part of the second embodiment driven in place.
Figure 13:
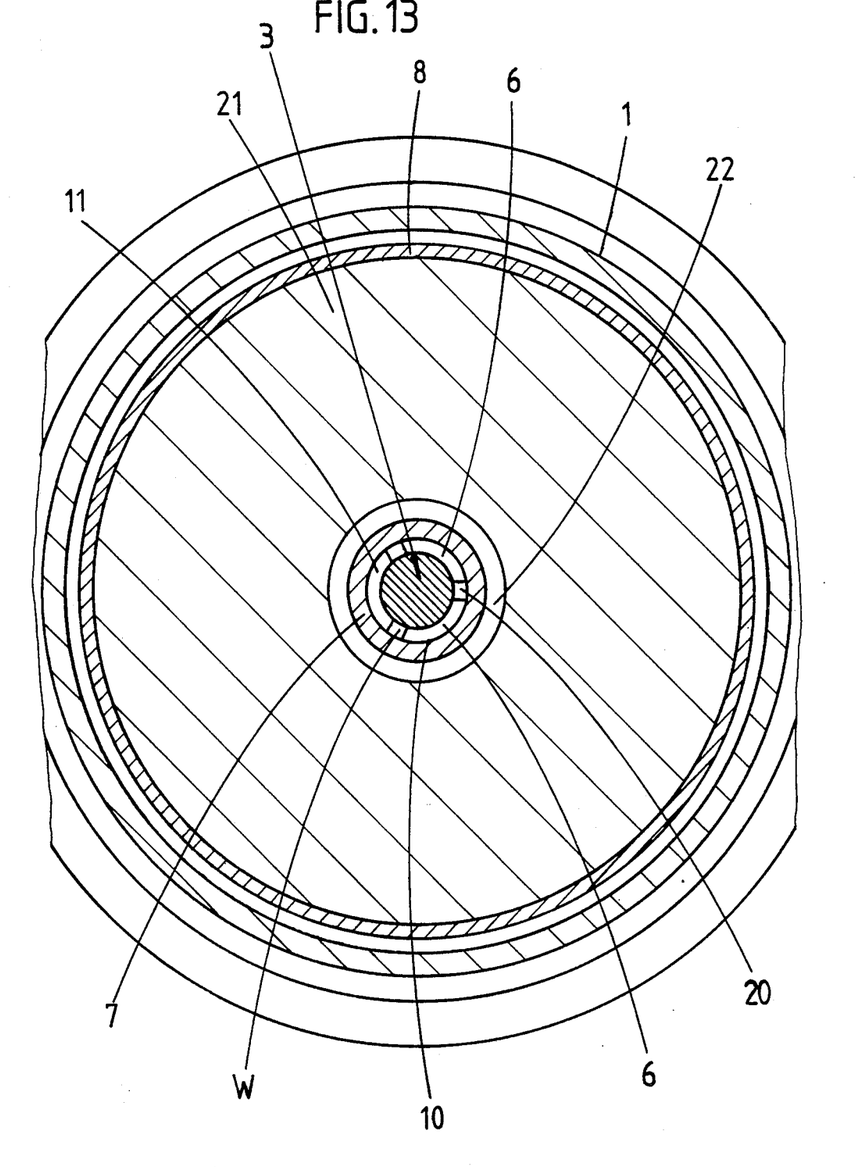
FIG. 13 is a sectional view taken along the line V—V of FIG. 10, in a larger scale than shown in FIG. 10.

FIG. 13, which represents a section along the line 13—13 of FIG. 10, clearly shows said openings 20 between the tear-off arms 6, which extend circumferentially in this embodiment.

The manufacturing of a stopper part 3 together with a piston 2 in accordance with the invention, particularly in accordance with the first embodiment mentioned, will now be explained, in particular with reference to FIGS. 6 to 8.

Figure 6:
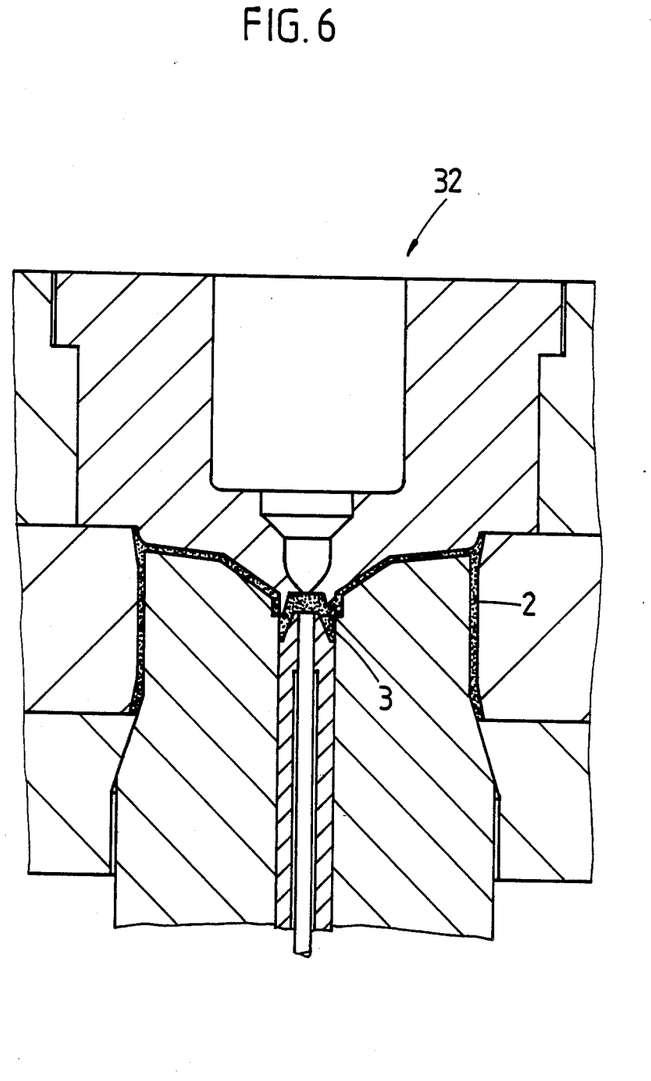
FIG. 6 is a sectional view through the injection mold with injection-molded piston and stopper part connected to it.

As can be noted from FIG. 6, the stopper part 3 and the piston 2 are produced together in a multipartite injection mold, provided generally with the reference numeral 32. It is advantageous that the piston 2 is injection-molded via a central region, namely the stopper part 3 serving as a sprue element, as a result of which a highly precise centricity can be obtained.

Figure 7:
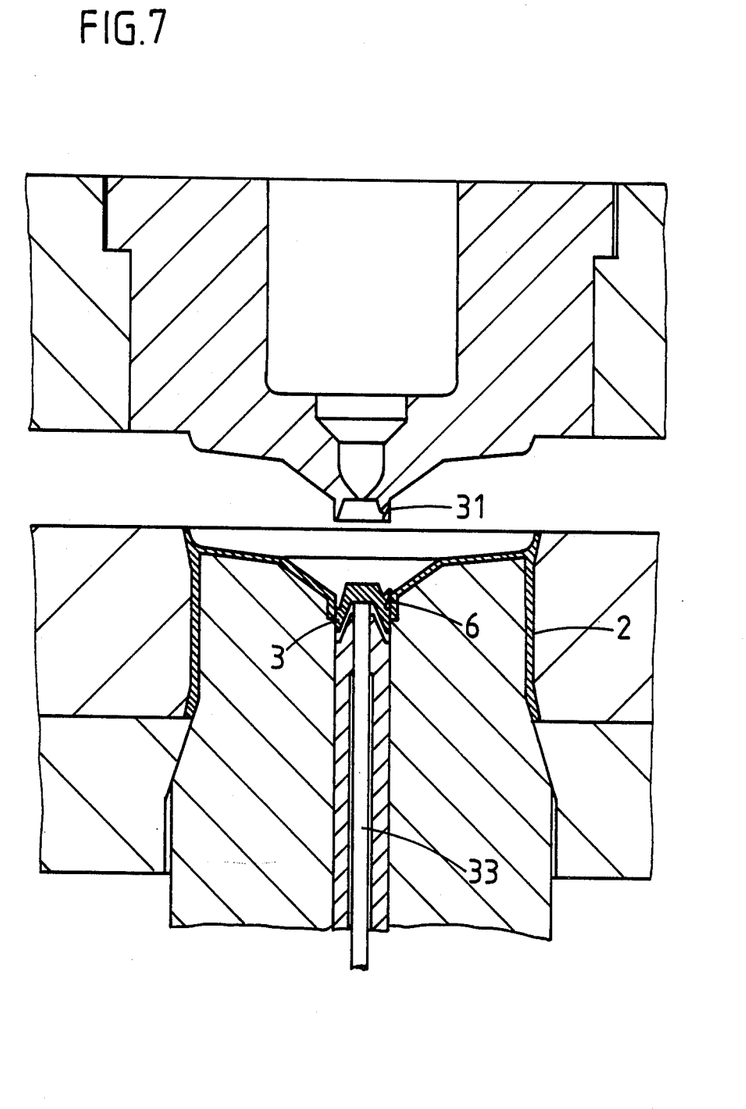
FIG. 7 is a view in accordance with FIG. 6 with the upper mold half withdrawn.

When the injection mold 32 is moved apart as shown in FIG. 7, by means of mold sleeves 31, by which the said tear-off arms 6 of larger diameter are formed, these tear-off arms are separated from the piston 2, however, the stopper part 3 is already carried along in the direction of closure. In addition, there is provided in the injection mold 32 a ram 33 driving the stopper part 3, in part, into the stopper seat 5 in such a manner that the vent paths remain open, in the manner described.

The stopper part 3 and the piston 2 are made of the same material, polypropylene.

Figure 8:
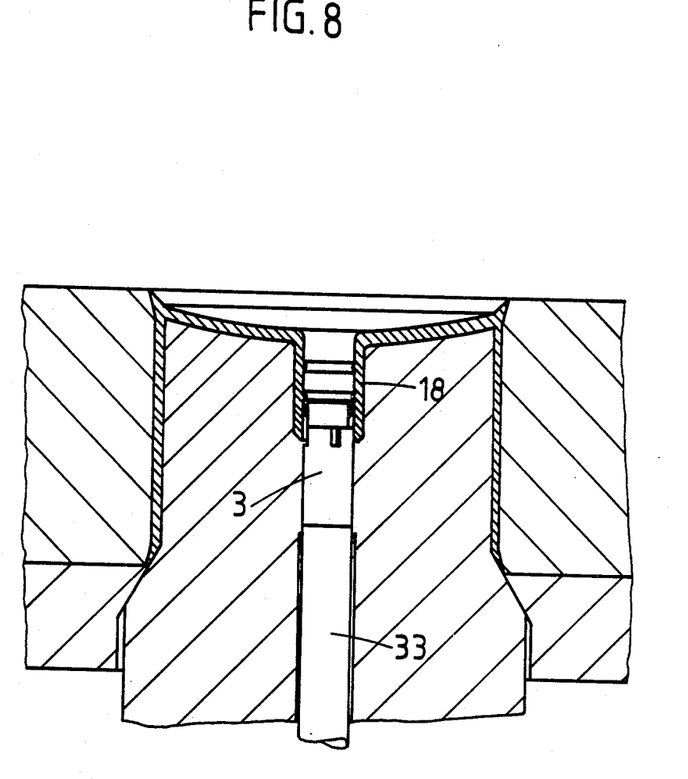
FIG. 8 is a sectional view through the lower part of an injection mold with injection-molded piston and partially pushed-in stopper part of a second embodiment.

FIG. 8 shows a stopper part 3 of the second embodiment, which also can be driven—, in part,—into the neck 18, in the injection mold, by the ram 33.

The filling of the dispenser 1 of the invention will now be briefly described. Referring, for instance, to FIGS. 5, 9, 10 and 12, the paste composition, namely, for instance, toothpaste, is introduced in correct volume via a filling tube, not shown in detail. The piston 2 is introduced from the standing-edge end of the dispenser housing 4, which is widened in slightly conical shape there. This is done by means of a centrally hollowed downward moving ram 34 of a suitable device. The cavity 35 of this ram 34 is so dimensioned so that its inner wall surrounds the neck 18, including the stopper part 3 of the piston 2, with radial as well as axial clearance. The end surface 36 of the ram 34 has a concave curvature corresponding to the dome-shaped curvature of the push bottom of the piston 2.

The ram 34 moves, carrying along the piston 2, into the open end of the dispenser housing 4. Upon reaching of the surface of the composition 16, the air enclosed between it and the end surface of the piston 2 has escaped via the slot openings 20, the vent zone. A certain portion of the paste composition possibly still rises into the passage cavity of the neck 18. After, in this way, practically complete evacuation of the air through the hollow 35 of the ram 34 where it emerges via a transverse channel 36, the stopper part 3 is now driven into the inside of the neck 18 via a mandrel 37 which passes centrally through the cavity 35. The abutment in both cases is formed by the paste composition itself. The mandrel 37 has on the wall side a longitudinal groove 38 which is in communucation with the transverse channel 36 via an annular space 39 which is open towards the hollow 35.

I claim:

1. A dispenser for the dispensing of paste compositions comprising:
    a piston movable in an emptying direction within a dispenser housing;
    a stopper part for closing the piston, adapted to be driven in sealing manner into the piston including radial arms connected thereto;
    a stopper seat being developed in said piston and the dispenser housing being evacuatable by an air vent zone located in the region of the stopper seat, said zone being defined by slots formed between the stopper seat and the stopper part which are interrupted by said radial arms of the stopper part,
    said arms forming two separate sections which lie one behind the other in an axial direction, and which are separated from each other by a free space, wherein at least those arms lying in a cross-sectional plane of one section of said two sections are formed as tear-off arms.

2. A dispenser according to claim 1, further comprising
    said tear-off arms being connected in a venting state with said piston and said stopper part.

3. A dispenser according to claim 1, further comprising
    said tear-off arms being connected in a venting condition to said stopper part and being separated from said piston.

4. A dispenser according to claim 1, wherein
    said stopper part has a longitudinal axis and further comprising at least one of said tear-off arms forming an acute angle with said longitudinal axis of said stopper part.

5. A dispenser according to claim 1, further comprising
    spacer warts disposed along the circumference of the stopper part for the formation of said vent zone.

6. A dispenser according to claim 1, further comprising
    said stopper part having a conical front region and a substantially cylindrical region adjoining said conical front region.

7. A dispenser according to claim 6, wherein
    said spacer warts are arranged on the cylindrical region.

8. A dispenser according to claim 6, wherein
    said cylindrical region has a circumferential annular bead.

9. A dispenser according to claim 7 wherein said cylindrical region has a circumferential annular bead.

10. A dispenser according to claim 1, wherein
said stopper has an inside diameter and said stopper part has a collar which widens in funnel shape to a size exceeding said inside diameter of said stopper seat.

11. A dispenser according to claim 1, wherein
said stopper part has a smaller cross section and is stepped down stepwise on its central section, so that the region of said smaller cross section extends freely into the stopper seat and that the tear-off arms are seated at the height of a step and extend up to the free end edge of the stopper seat.

12. A dispenser according to claim 11, further comprising
said stopper seat having an inner surface and said inner surface having at least one sealing ring bead located at a distance from said end edge which is less than the length of the stopper section of larger diameter.

13. A dispenser according to claim 1, wherein
said piston is cup-shaped and said stopper seat extends concentrically into the inside of said piston.

14. A method of manufacturing a piston and stopper part, for use in a dispenser for dispensing of paste compositions in which the piston is adapted to be movable in an emptying direction within a dispenser housing,
the stopper part serving for closing the piston, being adapted to be driven in sealing manner into the piston, and including radial arms connected thereto,
a stopper seat being developed in said piston and the dispenser housing being evacuatable by an air vent zone located in the region of the stopper seat, said zone being defined by slots formed between the stopper seat and the stopper part which are interrupted by said radial arms of the stopper part,
said arms forming two separate sections which lie one behind the other in an axial direction, and which are separated from each other by a free space, wherein at least those arms lying in a cross-sectional plane of one section of said two sections are formed as tear-off arms, the method comprising the step of;
jointly producing the piston and the stopper part by means of injection molding.

15. A method according to claim 14, wherein
said piston being injection molded from a central region by providing a sprue element which is shaped so as to be used as the stopper part.

16. A method according to claim 14, further comprising
said stopper part being partially driven into the stopper seat by the injection molding.

17. A method according to claim 14, further comprising
said stopper part and said piston are made of polypropylene.

* * * * *